(12) United States Patent
Muurinen et al.

(10) Patent No.: US 10,340,750 B2
(45) Date of Patent: Jul. 2, 2019

(54) FOREIGN OBJECT DETECTION MANIPULATION METHOD

(71) Applicant: Nokia Technologies Oy, Espoo (FI)

(72) Inventors: Jari Muurinen, Perniö (FI); Petri Vuori, Salo (FI); Juhani Kari, Lieto (FI); Miika Tupala, Turku (FI)

(73) Assignee: Nokia Technologies Oy, Espoo (FI)

( * ) Notice: Subject to any disclaimer, the term of this patent is extended or adjusted under 35 U.S.C. 154(b) by 206 days.

(21) Appl. No.: 14/728,450

(22) Filed: Jun. 2, 2015

(65) Prior Publication Data
US 2015/0364925 A1    Dec. 17, 2015

(30) Foreign Application Priority Data

Jun. 13, 2014  (FI) .................................. 20145561

(51) Int. Cl.
| | |
|---|---|
| *H02J 5/00* | (2016.01) |
| *H02J 7/02* | (2016.01) |
| *H02J 7/04* | (2006.01) |
| *H02J 50/60* | (2016.01) |
| *H02J 50/80* | (2016.01) |
| *H02J 50/70* | (2016.01) |

(Continued)

(52) U.S. Cl.
CPC .............. *H02J 50/60* (2016.02); *H02J 5/005* (2013.01); *H02J 7/045* (2013.01); *H02J 50/12* (2016.02); *H02J 50/70* (2016.02); *H02J 50/80* (2016.02); *H04B 5/0031* (2013.01); *H04B 5/0037* (2013.01)

(58) Field of Classification Search
None
See application file for complete search history.

(56) References Cited

U.S. PATENT DOCUMENTS

| 8,620,484 B2 | 12/2013 | Baarman et al. |
|---|---|---|
| 8,836,273 B2 | 9/2014 | Yoda et al. |
| 2009/0127936 A1 | 5/2009 | Kamijo et al. |

(Continued)

FOREIGN PATENT DOCUMENTS

| CN | 101981780 A | 2/2011 |
|---|---|---|
| CN | 103765728 A | 4/2014 |

(Continued)

OTHER PUBLICATIONS

International Search Report and Written Opinion received for corresponding Patent Cooperation Treaty Application No. PCT/FI2015/050319, dated Sep. 22, 2015, 9 pages.

(Continued)

*Primary Examiner* — Jared Fureman
*Assistant Examiner* — Aqeel H Bukhari
(74) *Attorney, Agent, or Firm* — Banner & Witcoff, Ltd.

(57) ABSTRACT

The invention relates to a method that comprises receiving wireless energy from a wireless energy transmitter device; determining a power level value of the received wireless energy; manipulating value of the determined power level to obtain a manipulated power level value; and sending the manipulated power level value to the wireless energy transmitter device so that a FOD does not prevent the power transfer from the wireless energy transmitter device. The invention further relates to an apparatus, a device and a computer program product for performing the method.

15 Claims, 4 Drawing Sheets

(51) Int. Cl.
  *H02J 50/12* (2016.01)
  *H04B 5/00* (2006.01)

(56) References Cited

U.S. PATENT DOCUMENTS

| | | | | |
|---|---|---|---|---|
| 2010/0118677 | A1* | 5/2010 | Fushimi | G11B 7/1267 369/53.28 |
| 2010/0225173 | A1 | 9/2010 | Aoyama et al. | |
| 2011/0128015 | A1 | 6/2011 | Dorairaj et al. | |
| 2013/0257168 | A1 | 10/2013 | Singh | |
| 2014/0103869 | A1* | 4/2014 | Radovic | H04B 5/0037 320/108 |
| 2014/0239732 | A1 | 8/2014 | Mach et al. | |

FOREIGN PATENT DOCUMENTS

| | | |
|---|---|---|
| JP | 2013/541313 A | 11/2013 |
| WO | 2009/081115 A1 | 7/2009 |
| WO | 2009081115 A1 | 7/2009 |
| WO | 2009/105595 A2 | 8/2009 |
| WO | 2012/040530 A2 | 3/2012 |
| WO | 2013/056234 A2 | 4/2013 |
| WO | 2014/060871 A1 | 4/2014 |
| WO | 2014060871 A1 | 4/2014 |

OTHER PUBLICATIONS

Extended European Search Report received for corresponding European Patent Application No. 15168559.1, dated Oct. 23, 2015, 7 pages.
"System Description Wireless Power Transfer", Wireless Power Consortium, vol. 1: Low Power, Part 1: Interface Definition, Version 1.1.2, Jun. 2013, 186 pages.
Office action received for corresponding Finnish Patent Application No. 20145560, dated Dec. 2, 2014, 5 pages.
Office action received for corresponding Finnish Patent Application No. 20145561, dated Dec. 16, 2014, 8 pages.
Hui, "Planar Wireless Charging Technology for Portable Electronic Products and Qi", Proceedings of the IEEE, vol. 101, No. 6, Jun. 2013, pp. 1290-1301.
Sep. 7, 2017 (JP) Japanese Office Action—App 2016-571286.
Jun. 4, 2018—(CN) First Office Action—App 201580029788.1.
Aug. 13, 2018—(EP) Office Action—App 15168559.1.
Wireless Power Consortium: "System description wireless power transfer, vol. 1: Low power, Part 1: Interface definitiion, Version 1.1.2", Jun. 1, 2013.
Jun. 27, 2018—U.S. Final Office Action—U.S. Appl. No. 15/317,268.
Nov. 29, 2018—U.S. Non-Final Office Action—U.S. Appl. No. 15/317,268.

* cited by examiner

FOREIGN OBJECT DETECTION MANIPULATION METHOD

BACKGROUND

Electromagnetic induction has been known for a long time and it has been used in many applications. In electromagnetic induction a time-varying magnetic flux induces an electromotive force to a closed conductor loop. Vice versa, a time-varying current creates a varying magnetic flux. In transformers, this phenomenon is utilized to transfer energy wirelessly from a circuit to another via inductively coupled coils. A primary coil transforms an alternating current into a varying magnetic flux, which is arranged to flow through the secondary coil. The varying magnetic flux then induces an alternating voltage over the secondary coil.

Wireless charging is an application where electromagnetic induction is used to transfer energy over air. A wireless charging system comprises a charger device i.e. a WLC transmitter with a primary coil, and a device to be charged, receiver device, i.e. a WLC receiver with a secondary coil. The current in the charger device is transferred to the receiver device through these electromagnetically coupled coils, and the induced current may be further processed and used to charge the battery of the charged device. Energy is transmitted through inductive coupling from the charger device to the charged device, which may use that energy to charge batteries or as direct power. The wireless charger device comprises a charging area, onto which the receiver device is arranged to receive inductive energy from the charger device. Other unwanted metallic foreign object(s) in that charging area during the inductive energy transmission may, however, heat up and cause safety hazards in addition to power losses.

SUMMARY

Now there has been invented an improved method and technical equipment implementing the method, by which the above problems are alleviated. Various aspects of the invention include a method, an apparatus, a server, a client and a computer-readable medium comprising a computer program stored therein, which are characterized by what is stated in the independent claims. Various embodiments of the invention are disclosed in the dependent claims.

According to a first aspect, there is provided a method comprising: receiving wireless energy from a wireless energy transmitter device, determining a power level value of the received wireless energy, manipulating value of the determined power level to obtain a manipulated power level value, and sending the manipulated power level value to the wireless energy transmitter device.

According to an embodiment, the manipulated power level is obtained by increasing the determined power level by an offset value. According to an embodiment, a difference between a transmitting power level value and the manipulated power level value is arranged to remain below a threshold value set for a foreign object detection method. According to an embodiment, the manipulated power level value is upper bounded by a maximum received power level.

According to a second aspect, there is provided apparatus comprising at least one processor, memory including computer program code, the memory and the computer program code configured to, with the at least one processor, cause the apparatus to perform at least the following: receive wireless energy from a wireless energy transmitter device, determine a power level value of the received wireless energy, manipulate value of the determined power level to obtain a manipulated power level value, and send the manipulated power level value to the wireless energy transmitter device.

According to an embodiment, the manipulated power level is obtained by increasing the determined power level by an offset value. According to an embodiment, a difference between a transmitting power level value and the manipulated power level value is arranged to remain below a threshold value set for a foreign object detection method. According to an embodiment, the manipulated power level value is upper bounded by a maximum received power level.

According to a third aspect, there is provided a device comprising at least one processor, memory including computer program code, the memory and the computer program code configured to, with the at least one processor, cause the device to perform at least the following: transmit wireless energy at a transmit power level to a wireless power receiver, execute a foreign object detection method if the transmit power level is above a threshold value set for the foreign object detection method, and continue to transmit wireless energy, if the transmit power level is below a threshold value set for the foreign object detection method.

According to an embodiment, the transmit power level is a maximum transmit power level and the device is further caused to receive the maximum transmit power level from the wireless power receiver. According to an embodiment, the transmit power level is a maximum transmit power level and the device is further caused to: receive a maximum receive power level value from the wireless power receiver, and determine the maximum transmit power level based on the received maximum receive power level value and a threshold value set for the foreign object detection method.

According to a fourth aspect, there is provided an apparatus comprising means for receiving wireless energy from a wireless energy transmitter device, means for determining a power level value of the received wireless energy, means for manipulating value of the determined power level to obtain a manipulated power level value, and means for sending the manipulated power level value to the wireless energy transmitter device.

According to a fifth aspect, there is provided a computer program product embodied on a non-transitory computer readable medium, comprising computer program code configured to, when executed on at least one processor, cause an apparatus to receive wireless energy from a wireless energy transmitter device, determine a power level value of the received wireless energy, manipulate value of the determined power level to obtain a manipulated power level value, and send the manipulated power level value to the wireless energy transmitter device.

According to an embodiment, the manipulated power level is obtained by increasing the determined power level by an offset value. According to an embodiment, a difference between a transmitting power level value and the manipulated power level value is arranged to remain below a threshold value set for a foreign object detection method. According to an embodiment, the manipulated power level value is upper bounded by a maximum received power level.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of an inductive energy receiver device, for example, a wireless charging (WLC) receiver and an inductive energy charger device i.e. a WLC transmitter, transmitting inductive energy for the receiver device. It is to be noted that different embodiments may have applications widely in any environment where an apparatus is suitable to transfer inductive energy. In embodiments, the inductive energy charger device may be used to transfer inductive energy to an inductive energy receiver device wirelessly and therefore the inductive energy charger device, as described throughout the specification, may be generally referred to as a WLC transmitter. In addition, in embodiments, the inductive energy receiver device may be used to receive inductive energy from a WLC transmitter wirelessly and therefore the inductive energy receiver device, as described throughout the specification, may be generally referred to as a WLC receiver.

The WLC transmitter comprising a primary WLC coil is suitable to transmit inductive energy by inductive coupling or magnetic resonance, i.e., by an inductive energy link to a WLC receiver comprising a secondary WLC coil. The WLC receiver may be, for example, a mobile phone, a mobile computer, a mobile collaboration device, a mobile internet device, a smart phone, a tablet computer, a tablet personal computer (PC), a personal digital assistant, a handheld game console, a portable media player, a digital still camera (DSC), a digital video camera (DVC or digital camcorder), a pager, or a personal navigation device (PND). The WLC transmitter may also be implemented in objects suitable for charging such devices, e.g., a hand bag, pillow, table, cloth etc. In some embodiments, wireless power transfer may comprise capacitive coupling with the transmitter and the receiver.

Wireless power transfer, e.g. wireless charging, process may comprise four phases: selection, ping, identification & configuration, and power transfer.

In the selection phase, the WLC Transmitter may monitor the charging area for the placement and removal of objects, for example, a WLC receiver. This phase may be also called the analog ping. The term "charging area" may refer to an interface surface, onto which the WLC transmitter transfers inductive energy to a WLC receiver. In general, the term "charging area" refers to any location with respect to the WLC transmitter, where wireless power transfer from the WLC transmitter to a WLC receiver is possible.

In the ping phase, the transmitter executes a Digital Ping, and listens for a response. The WLC transmitter applies a power signal and detects whether the WLC receiver modulates the power signal to send a Signal Strength Packet. Modulation of the power signal may be implemented for example by load modulation where an additional load is switched on and off to change the power drawn from the WLC transmitter. Communication between the WLC transmitter and WLC receiver may be also implemented using another communication path, e.g., a short-range radio link such as Bluetooth.

In the identification & configuration phase, the WLC transmitter identifies the selected WLC receiver, and obtains configuration information such as the maximum amount of power that the WLC receiver intends to provide at its output. The WLC transmitter uses this information to create a Power Transfer Contract.

In the power transfer phase, the WLC transmitter continues to provide power to the WLC receiver, adjusting the power level in response to control data (Control Error Packets) received from the WLC Receiver. WLC receiver may report the received power by sending at least one Rectified Power Packet to the WLC transmitter. Throughout this phase, the WLC transmitter monitors the parameters that are contained in the Power Transfer Contract (e.g. the maximum received power). A violation of any of the stated limits on any of those parameters may cause the WLC transmitter to abort the power transfer.

During the power transfer phase the transmitter also performs foreign object detection (FOD), e.g., by comparing the received power to the transmitted power as described above. In the FOD method the WLC receiver may report the received power to the WLC transmitter and the WLC transmitter may compare the received power to the transmitted power. By the FOD method the WLC transmitter may discover if an unwanted metallic foreign object(s) (FO) is/are on a charging area of the WLC transmitter in addition to the WLC receiver. As foreign objects in this context can count all other metal objects than power receiving means, for example, a secondary coil(s) of the WLC receiver used to receive the inductive energy. Unwanted metallic foreign object(s) on the charging area during power transmission may heat and may therefore increase power consumption i.e. power losses. Heating of the unwanted metallic foreign object(s) on the charging area during power transmission may cause safety hazards. When power loss exceeds a threshold set for it, the WLC transmitter may disable power transfer i.e. terminate the wireless charging.

The magnetic field of electromagnetic induction may interact or interfere with other components or friendly metals inside the WLC receiver exposed to the magnetic field; for example, semiconductor or discrete components may be damaged. The interference is more relevant in a high amount of power transfer than in a low amount of power transfer. The interference may be caused by heat generated by eddy currents or by high power level of the magnetic field. Therefore, the WLC receiver may comprise a shield that protects metals and components inside the WLC receiver during wireless power transfer. The shield is arranged to form a field and to keep it between the shields of the WLC devices i.e. between a WLC receiver and a WLC transmitter or a WLC transceiver so that materials and components inside the WLC receiver are not damaged or interfered. The shield of the WLC device may be ferromagnetic material, for example, ferrite or any other material suitable for protecting materials and components from magnetic field caused by inductive charging. However, the ferrite shield may increase costs of the WLC receiver and the ferrite shield may also thicken the WLC receiver Thinness and inexpensiveness are desired characteristic of many devices nowadays, and therefore the ferrite shield may not be a sought-after feature in a WLC receiver, wherein the WLC receiver may be, for example, a smart phone, mobile phone or tablet.

Because the interference is more relevant in a high amount of power transfer than in a low amount of power transfer, the ferrite shield may not be necessary for a WLC receiver if low power is used in wireless charging. Unshielded WLC devices may, however, cause problems for FOD methods, because the lack of shield enables warming of metals and components inside the WLC receiver during the wireless power transfer. In FOD method's point of view, metals and components inside the unshielded WLC receivers are foreign objects on the charging area during wireless charging because warming of metals and components causes power losses during the wireless charging. Due to power losses the FOD method may cause unnecessary termination of the power transfer. The FOD method may even cause prevention of the power transfer even if the power losses (heat) at the receiver of the unshielded WLC device are at a tolerable level.

Unshielded WLC receivers may, however, be suitable for low power inductive power transmission despite the FOD method, if the embodiments of the invention are used. By the embodiments of the invention it is possible to disable FOD so that even if the lack of ferrite shield causes more power to be consumed to heat in the WLC receiver, the FOD does not prevent the power transfer. The idea is to disable the FOD. Disabling the FOD may be implemented either at the WLC transmitter or the WLC receiver side. The term "disabling" should be understood to comprise either terminating a FOD algorithm at the transmitter or causing the FOD algorithm at the transmitter to operate with a different FOD threshold level. For example, the receiver may cause the FOD algorithm at the transmitter to operate with a higher threshold level, which effectively lowers the FOD performance.

The WLC receiver may disable the FOD by effectively increasing the FOD threshold by manipulating the reported received power i.e. RX power so that the power loss seems to be smaller and the FOD will not terminate the power transfer. The manipulating may be done by sending such an RX power value that is close enough to the transmitted power i.e. TX power value. The value of manipulated RX may be determined beforehand, for example, on the basis of maximum amount of power used in wireless charging. The configuration information transmitted by the WLC receiver to the WLC transmitter in identification & configuration phase may comprise this maximum amount of power information, e.g., a maximum transmitted power. It is also possible that the WLC receiver actually measures the received power and raises this value by some constant or variable. It is also possible that the WLC transmitter raises the RX power value instead of the WLC receiver after the WLC transmitter has receive this value from the WLC receiver and before comparing the RX and TX powers for determining the power loss.

If disabling the FOD is implemented at the WLC receiver side, the WLC transmitter may continue to run the FOD algorithm, but the manipulated RX power level value prevents the transmitter from terminating the power transfer. If disabling the FOD is implemented at the WLC transmitter, the transmitter may disable the whole FOD functionality if the power level i.e. maximum amount of power defined in configuration information and used in wireless charging is low enough. In this case, the transmitter may not execute a FOD algorithm or it may stop executing a FOD algorithm when transmitted power is at or decreases to a predetermined level.

In the following, several embodiments will be described in the context of FIGS. 1 through 5 of the drawings. It is to be noted, however, that embodiments should not be understood as limiting examples.

Figures 1, 2:
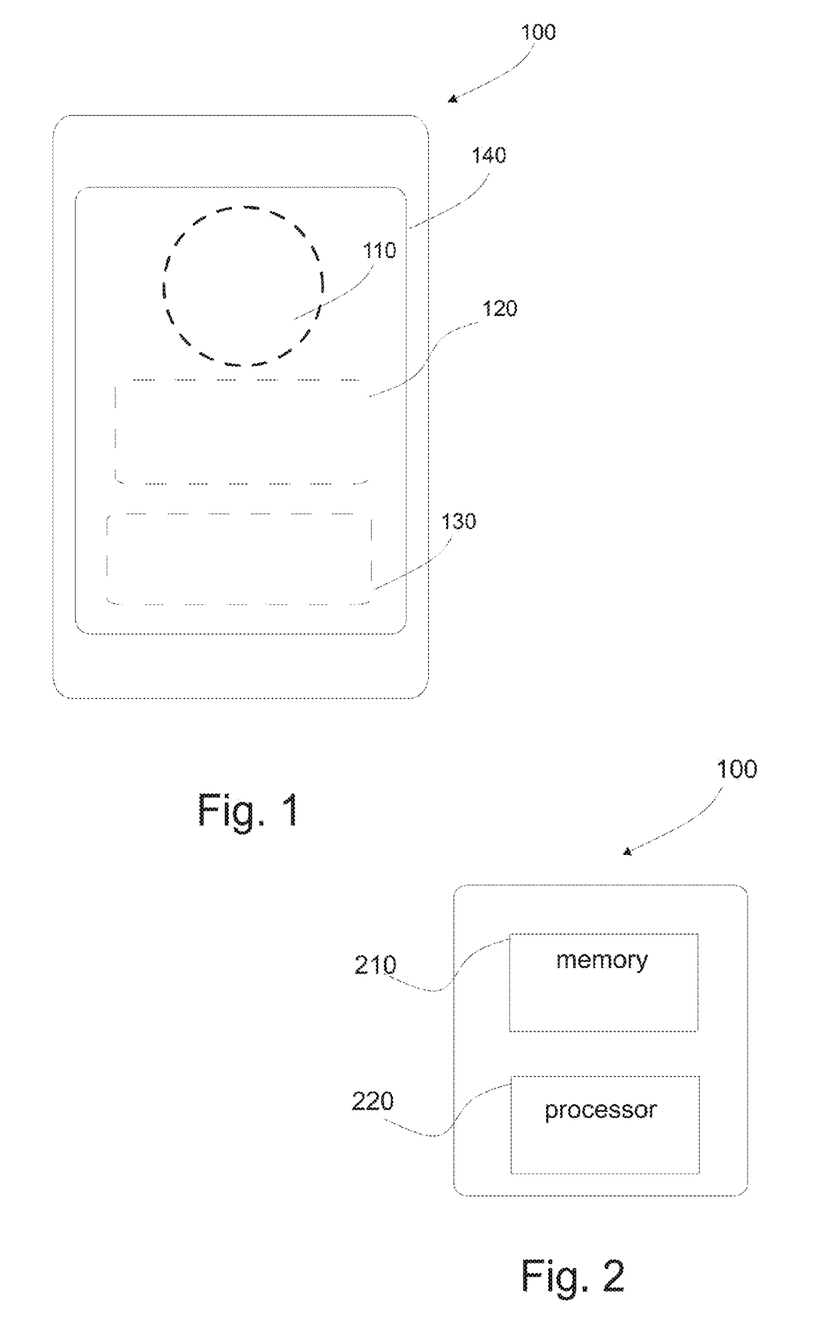
FIG. 1 shows an example of a device according to an embodiment.
FIG. 2 shows another example of a device according to an embodiment.

FIG. 1 shows an example of a battery-operated mobile device 100 with circuitry 110 for a FOD manipulation method implemented as an additional function for the device 100. It should be understood, however, that the device 100 as illustrated and hereinafter described is merely illustrative of one type of device that may benefit from various embodiments, and therefore should not be taken to limit the scope of the embodiments. As such, it should be appreciated that at least some of the components described below in connection with the device 100 may be optional and thus, in an example embodiment may include more, less or different components than those described in connection with the example embodiment of FIG. 1.

The mobile device 100 may be inductively chargeable, and it comprises means for wireless power reception. Examples of wireless power reception means include for example a receiver coil, a secondary coil 110, for receiving energy inductively and circuitry needed for inductive charging. The device 100 may not comprise a ferrite shield for protecting friendly metals of the device 100, or, the device 100 may comprise a thin ferrite shield (not shown) that is designed for low-power reception. The device 100 further comprises a battery 120 and other required electronics and circuitry 130. The circuitry 130 is arranged to detect/determine received power of the device 100, control charging of the battery 120, and manipulate received power and report the manipulated received power to a WLC transmitter charging the device 100. The mobile device 100 comprises a memory (FIG. 2: 210) configured to store computer program code used for determining, manipulating and transmitting received power level of the device 100 and controlling charging of the battery 120. The mobile device 100 further comprises a processor (FIG. 2: 220) that executes the program code to perform the device's 100, including circuitry's 130, functionality. The mobile device 100 may further comprise a display 140 and an input/output element to provide e.g. user interface views to the display. The mobile device 100 may further have one or more physical buttons or one or more touch-screen buttons. The mobile device 100 may comprise a keypad being provided either on the display as a touch-screen keypad or on the housing of the apparatus as a physical keypad (not shown). The mobile device 100 may further comprise a microphone and a loudspeaker (not shown) to receive and to transmit audio. The mobile device 100 may also comprise a communication interface (not shown) configured to connect the apparatus to another device, via wireless and/or wired network, and to receive and/or transmit data by said wireless/wired network. Wireless communication can be based on any cellular or non-cellular technology, for example GSM (Global System for Mobile communication), WCDMA (Wideband Code Division Multiple Access), CDMA (Code Division Multiple Access). Wireless communication can also relate to short range communication such as Wireless Local Area Network (WLAN), Bluetooth etc. The mobile device 100 may use the loudspeaker to provide audio messages for user, such as the battery being damaged. In addition, in the display 140 the device 100 may indicate the user about the state of wireless charging, charging/not charging or the state of the battery 120. It is also possible that the device comprises some sensors, such as a camera, an accelerometer, a gyroscope etc. The electrical connections inside the device 100 are not shown.

FIG. 2 shows another example of a battery-operated mobile device 100 according to an embodiment. The memory 210 of the device 100 is configured to store computer program code used for the FOD manipulating method, algorithm, comprising determination of the received power and/or manipulating value of the received power and transmitting the manipulating power to the WLC transmitter transmitting the power to the device 100. Optionally, the stored computer program code is used for controlling the charging circuitry 110, if needed, in context with charging, automatically. FOD manipulating software may be implemented as separate application and/or it can be a part of the operating system of the device 100. The processor 220 executes the program code to perform the device's and circuitry's functionality.

Figure 3:
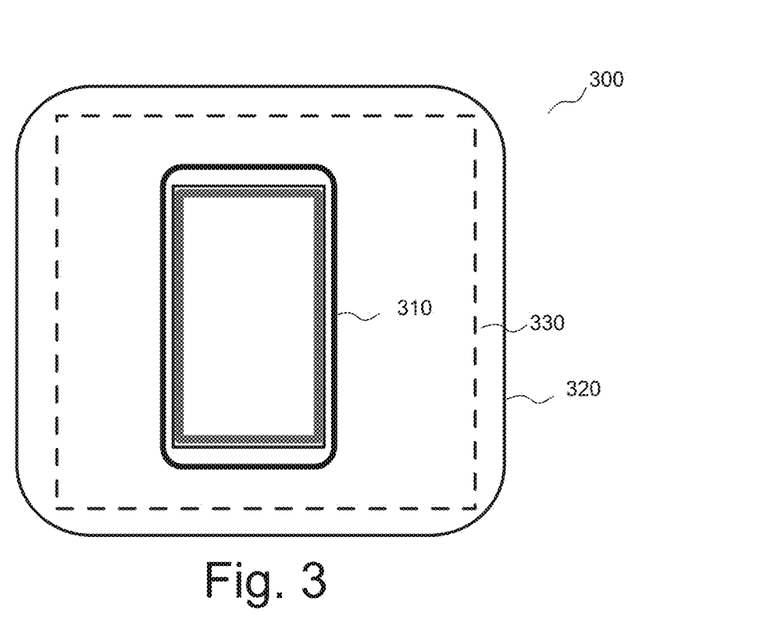
FIG. 3 shows an example of WLC system according to an embodiment.

FIG. 3 shows a WLC system according to an embodiment. The WLC system 300 comprises a WLC receiver 310 and a WLC transmitter 320. The WLC receiver 310 is arranged onto a charging area 330 of the WLC transmitter 320. The type of the WLC transmitter 320 or charging area 330 is not restricted to the shown embodiment. The WLC receiver 310 may not comprise a ferrite shielding or may comprise only a limited ferrite shielding and the power level used in the WLC system 300 is low. The WLC receiver 310 has determined the maximum received power level, which power level is low enough to safely operate without a strong shield and FOD. This determination is done by the WLC receiver 310, for example, in the identification and configuration phase by selecting sufficiently low maximum received power, for example, 500 . . . 600 mW. In some embodiments, the WLC receiver may determine the maximum transmitted power and communicate this to the WLC transmitter 320. The receiver 310 may also control the TX power transmitted by the WLC transmitter 320 during the power transfer phase by sending Control Error packets to request the WLC transmitter 320 to increase or decrease the power level. In any case the receiver 310 is able to keep the transmitted power on a safe level. In addition the WLC receiver 310 may transmit manipulated RX power data to the transmitter 320 so that the power losses at least seem to be low enough.

Figure 4:
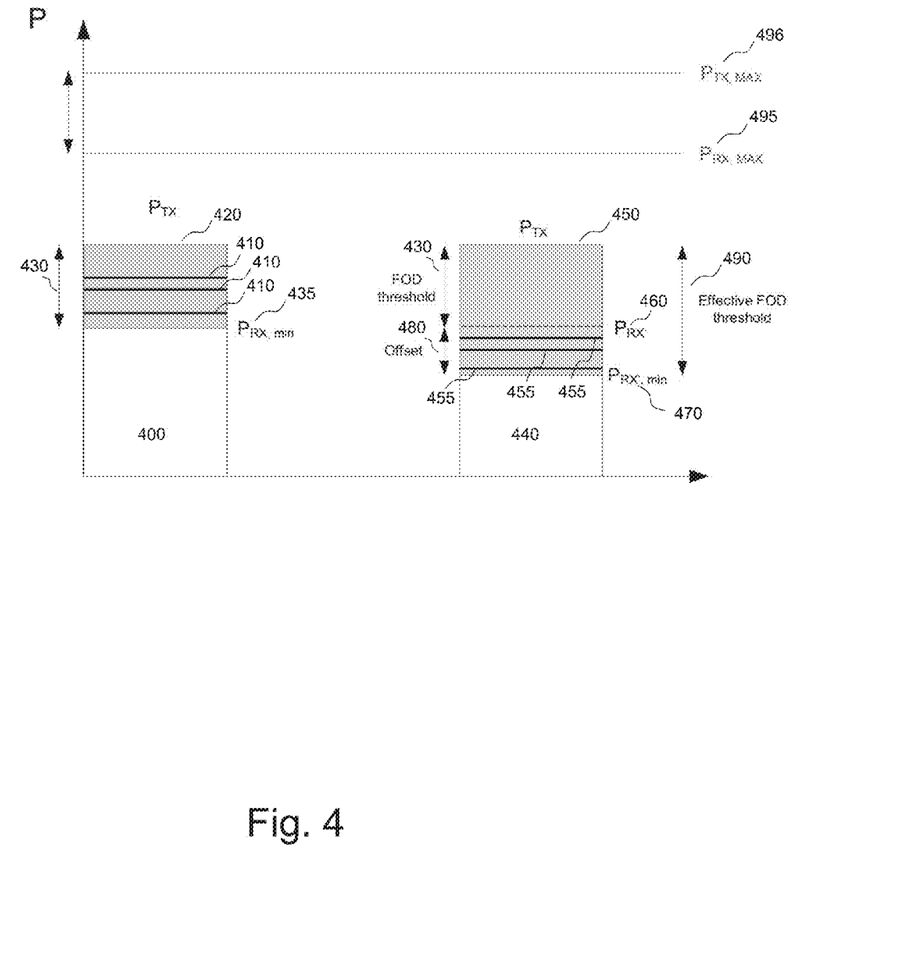
FIG. 4 shows examples of power level bars in a first WLC system and a second WLC system according to an embodiment of the invention.

FIG. 4 shows power level bars in a first WLC system and a second WLC system according to an embodiment.

In the first WLC system, a bar 400 shows examples of the (actual) received power levels PRX 410, which values of power levels PRX 410 a WLC receiver reports to a WLC transmitter. The WLC transmitter compares the received power PRX 410 to the transmitted power PTX 420 and determines power loss as the difference between TX 420 and RX power 410. If power loss exceeds the FOD threshold 430, the WLC transmitter terminates power transfer. Hence, for each TX power level PTX 420 there is a minimum received power level PRX,min 435 that the WLC receiver should receive to keep the WLC transmitter operational (power loss).

A bar 440 shows manipulation of received power level value for preventing a FOD method according to an embodiment of the invention. Bar 440 shows transmitted power PTX 450, examples of the (actual) received power level PRX 455, and manipulated power level PRX' 460. The manipulated power level PRX' 460 represents an artificially grown received power level PRX 455. The WLC receiver sends this manipulated power level value PRX' 460 to the WLC transmitter. The manipulated power level value PRX' 460 is transmitted to the WLC transmitter instead of the (actual) received power PRX 455 so that the power loss will not exceed a predetermined FOD threshold value 430 and the WLC transmitter may continue the power transfer even if the real power loss is higher than the FOD threshold 430. The actual received power may be as low as PRX',min 470 as long as the reporting offset 480 increases the reported power level value PRX' above the original minimum power level PRX,min 435. Thus, the WLC receiver is able to increase the effective FOD threshold and the FOD algorithm at the WLC transmitter will not terminate the power transfer. In this embodiment the PRX' is achieved by summing the offset value 480 with the PRX',min value 475 i.e. PRX'=PRX',min+A, wherein the A is the offset 480. It should be noted that the manipulated power level value PRX' 460 may be upper bounded by a maximum received power level. Effective FOD threshold 490 indicates a real acceptable power loss i.e. a difference between a transmitting power level value PTX 450 and the received power level.

FIG. 4 shows also the maximum received power level PRX,MAX 495 that is agreed in the power transfer contract. The WLC receiver may ensure that the transmitted power level PTX,MAX 496 remains at a safe level and therefore the reported received power could be limited to the amount agreed in the power transfer contract. In other words, the WLC receiver may be configured such that the reported and manipulated RX (PRX' 460) power is upper bound by the maximum received power PRX,MAX 495.

Determining the manipulated PRX' 460 may take into account various operating parameters of the WLC receiver device. In one embodiment, the WLC receiver device monitors a temperature at the WLC receiver. If the temperature increases above a temperature threshold, the WLC receiver may determine the manipulated power level PRX' 460 by using a second reporting offset. The second reporting offset may be for example lower than the reporting offset 480 used when the temperature at the WLC receiver device is within a normal temperature range.

According to another embodiment, the applications or processes running at the WLC receiver device may be taken into account when determining the manipulated power level PRX' 460. Some functions may be more sensitive to the magnetic field produced by the WLC transmitter and therefore a WLC receiver may use a different offset for determining the manipulated power level when a predetermined application, such as for example navigation, is running in the WLC receiver device or when an application is using a predetermined resource, such as for example a magnetometer.

According to another embodiment, the offset may be opposite i.e. the receiver may report an artificially low power level. This would make the FOD threshold lower and this embodiment could be used in WLC receivers that are particularly sensitive to the magnetic field produced by the transmitter.

According to another embodiment, a WLC transmitter receives the maximum RX power level from a WLC receiver in the identification and configuration phase. If the intended maximum received power level is low enough, the transmitter disables FOD algorithms for this WLC receiver. Otherwise, the FOD methods may be performed as usual and the system may use FOD manipulation method of FIG. 2.

In another embodiment, the WLC transmitter may continuously monitor the TX power level and dynamically switches the FOD methods ON/OFF.

Figure 5:
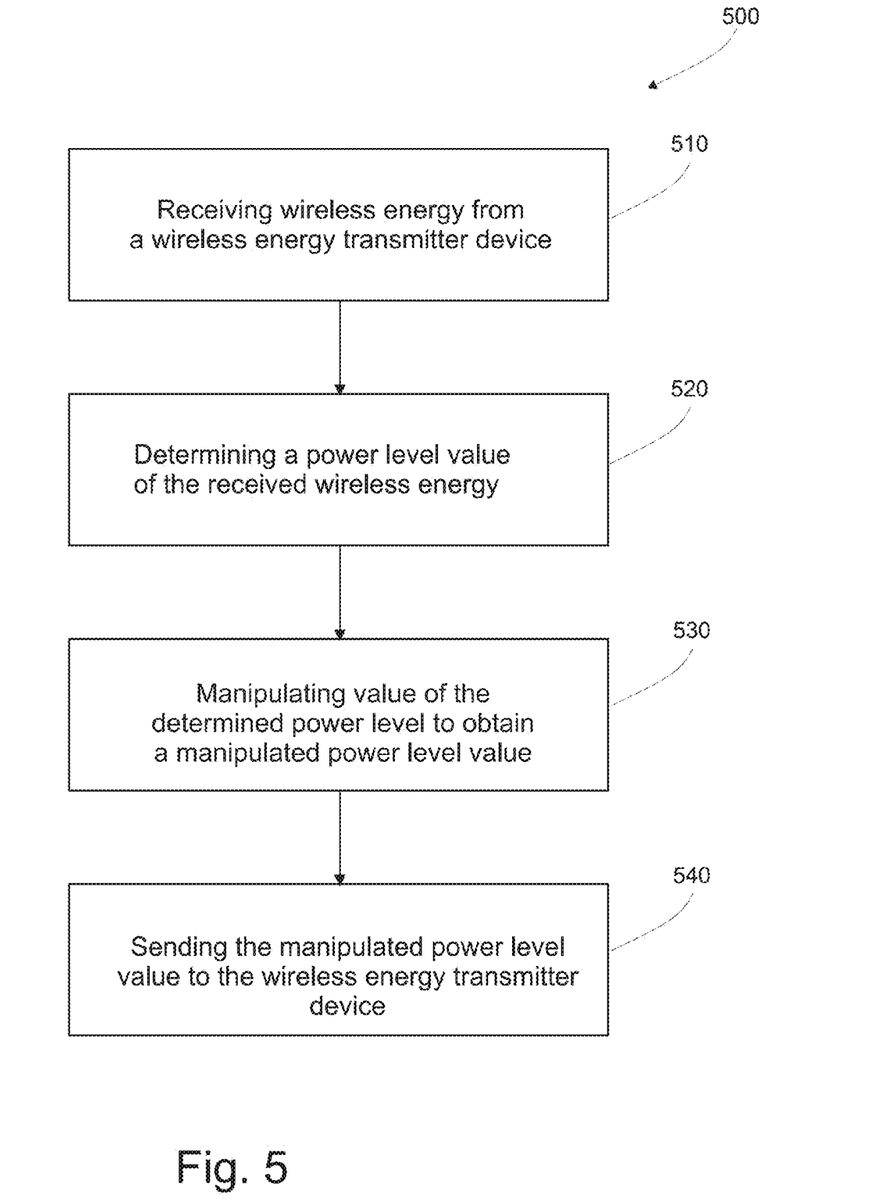
FIG. 5 shows an example of flow chart of a FOD manipulation method of a WLC system/receiver according to an embodiment.

FIG. 5 shows a flow chart of a FOD manipulation method 500 of a WLC system/receiver according to an embodiment. In the method 500, in step 510, a wireless power receiver receives wireless energy from a wireless energy transmitter device. In step 520, the receiver determines a power level value of the received wireless energy. In step 530, the receiver manipulates value of the determined power level to obtain a manipulated power level value. In step 540, the receiver sends the manipulated power level value to the wireless energy transmitter device.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment.

It is obvious that the present invention is not limited solely to the above-presented embodiments, but it can be modified within the scope of the appended claims.

The invention claimed is:

1. A method, comprising:
   receiving a wireless power signal from a wireless energy transmitter device;
   determining a power level value of the received wireless power signal;
   manipulating the determined power level value to obtain a manipulated power level value; and
   sending the manipulated power level value to the wireless energy transmitter device.

2. A method according to claim 1, wherein the manipulated power level value is obtained by increasing the determined power level value by an offset value.

3. A method according to claim 1, wherein a difference between a transmitting power level value and the manipulated power level value is arranged to remain below a threshold value set for a foreign object detection method.

4. A method according to claim 1, wherein the manipulated power level value is upper bounded by a maximum received power level.

5. An apparatus comprising at least one processor and memory, the memory including computer program code, the memory and the computer program code configured to, with the at least one processor, cause the apparatus to perform at least the following:
   receive a wireless power signal from a wireless energy transmitter device;
   determine a power level value of the received wireless power signal;
   manipulate the determined power level value to obtain a manipulated power level value; and
   send the manipulated power level value to the wireless energy transmitter device.

6. An apparatus according to claim 5, wherein the manipulated power level value is obtained by increasing the determined power level value by an offset value.

7. An apparatus according to claim 5, wherein a difference between a transmitting power level value and the manipulated power level value is arranged to remain below a threshold value set for a foreign object detection method.

8. An apparatus according to claim 5, wherein the manipulated power level value is upper bounded by a maximum received power level.

9. A device comprising at least one processor and memory, the memory including computer program code, the memory and the computer program code configured to, with the at least one processor, cause the device to perform at least the following:
   transmit a wireless power signal at a transmit power level to a wireless power receiver;
   in response to a determination that the transmit power level is above a threshold value set for a foreign object detection method, execute the foreign object detection method; and
   in response to a determination that the transmit power level is below the threshold value, continue power transmission without executing the foreign object detection method.

10. A device according to claim 9, wherein the transmit power level is a maximum transmit power level and the device is further caused to receive the maximum transmit power level from the wireless power receiver.

11. A device according to claim 10, wherein the device is further caused to:
   receive a maximum receive power level value from the wireless power receiver; and
   determine the maximum transmit power level based on the received maximum receive power level value and a threshold value set for the foreign object detection method.

12. A computer program product embodied on a non-transitory computer readable medium, comprising computer program code configured to, when executed on at least one processor, cause an apparatus to:
   receive a wireless power signal from a wireless energy transmitter device;
   determine a power level value of the received wireless power signal;
   manipulate the determined power level value to obtain a manipulated power level value; and
   send the manipulated power level value to the wireless energy transmitter device.

13. A computer program product according to claim 12, wherein the manipulated power level value is obtained by increasing the determined power level value by an offset value.

14. A computer program product according to claim 12, wherein a difference between a transmitting power level value and the manipulated power level value is arranged to remain below a threshold value set for a foreign object detection method.

15. A computer program product according to claim 12, wherein the manipulated power level value is upper bounded by a maximum received power level.

* * * * *

UNITED STATES PATENT AND TRADEMARK OFFICE
CERTIFICATE OF CORRECTION

PATENT NO. : 10,340,750 B2
APPLICATION NO. : 14/728450
DATED : July 2, 2019
INVENTOR(S) : Muurinen et al.

Page 1 of 2

It is certified that error appears in the above-identified patent and that said Letters Patent is hereby corrected as shown below:

On the Title Page

On the Page 2, Column 2, item (56), Other Publications, Line 18:
Delete "definitiion," and insert --definition,--

In the Claims

On Column 9, Claim 2, Line 27:
Delete "A" and insert --The--

On Column 9, Claim 3, Line 30:
Delete "A" and insert --The--

On Column 9, Claim 4, Line 34:
Delete "A" and insert --The--

On Column 9, Claim 6, Line 50:
Delete "An" and insert --The--

On Column 9, Claim 7, Line 53:
Delete "An" and insert --The--

On Column 10, Claim 8, Line 1:
Delete "An" and insert --The--

On Column 10, Claim 10, Line 19:
Delete "A" and insert --The--

On Column 10, Claim 11, Line 23:
Delete "A" and insert --The--

Signed and Sealed this
Eighth Day of October, 2019

Andrei Iancu
*Director of the United States Patent and Trademark Office*

CERTIFICATE OF CORRECTION (continued)
U.S. Pat. No. 10,340,750 B2

On Column 10, Claim 13, Line 43:
Delete "A" and insert --The--

On Column 10, Claim 14, Line 47:
Delete "A" and insert --The--

On Column 10, Claim 15, Line 52:
Delete "A" and insert --The--